Nov. 14, 1967 G. BRINKMANN 3,352,205
SLIDE PROJECTOR
Filed Oct. 19, 1965 3 Sheets-Sheet 3

3,352,205
SLIDE PROJECTOR

Gerhard Brinkmann, Braunschweig, Germany, assignor to Voigtlander A.G., Braunschweig, Germany, a corporation of Germany
Filed Oct. 19, 1965, Ser. No. 497,857
Claims priority, application Germany, Nov. 13, 1964, V 27,151
27 Claims. (Cl. 88—28)

The present invention relates to photographic slide projectors.

First, with the structure of the present invention it is possible to project on to a suitable wall, screen, or the like, an image derived from a photographic slide which can take the form of and transparency structure on which a photograph is impressed so that when the transparency or slide is properly positioned in the projector an image of the photograph impressed on the slide will be projected.

Projectors of this later type are known in many widely differing forms, but one of the most desirable forms is that type in which a stack of slides are arranged on one side of the optical axis to be successively advanced through the projector and received in a stack on the other side of the optical axis. These stacks of slides are substantially upright so that each slide can rest by gravity on the next lower slide in order to render the stacks substantially self-sustaining, and it is this type of projector which includes upstanding supply and receiving stacks of slides to which the present invention relates.

In one type of known projector which can accommodate stacks of slide substantially in the above-described manner, each slide is maintained in a substantially horizontal plane during projection of the photographic image. The optical structure is arranged beneath the slide so as to direct the light rays upwardly therethrough, and above the slide is situated a suitable reflector which redirects the light path so that it will extend horizontally to a suitable screen or the like. First, with this known construction exceedingly large height is required for the projector because it is essential to arrange beneath the slide, when the latter is in the projecting position, the projection lamp as well as the reflector and condenser lens structure associated therewith, and on the other hand it is necessary to situate over the slide, when the latter is in the projecting position, the reflector structure for changing the direction of the light rays. This reflector structure also requires a certain elevation in the structure of the projector in order to be properly accommodated therein, and in addition it is essential to provide structure for adjusting the reflector which further complicates the structure and requires additional space. A further disadvantage of this known type of construction is that the light is necessarily weakened because of the reflection thereof.

Also, it is known to provide viewers enabling the operator to directly view an image derived from a photographic slide, and in one type of known viewer a fixed slide-support, as in the previous case of the projector structure referred to above, is provided to support the slide in a substantially horizontal position when it extends across the optical axis to have an image produced. With this type of viewer the optical structure also extends substantially vertically and is arranged in part below and in part above the slide so as to provide at the top of the viewer the structure necessary to permit the user to observe an image. With this type of structure there are also a supply stack of slides and a receiving stack of slides, and both of these stacks extend in a generally upright direction, although they may be, together with the optical axis, somewhat inclined with respect to the perpendicular to the surface on which the viewer is mounted. This type of known structure is only suitable for directly viewing the image at the viewer itself and cannot be used for projecting an image on to a wall, screen, or the like.

There is also a known type of photographic device which on the one hand is capable of projecting an image on to a wall, screen, or the like, as in the case of the first type of projector referred to above, and on the other hand this structure is combined with a viewing assembly enabling the operator, if he so desires, to view an image directly at the device. For this purpose, there is arranged along the optical axis between the support for the slide, when the latter is in a projecting position, and a viewing lens, a tiltable reflector capable of being moved to and from a position extending across the optical axis. When this light reflector is situated beyond the optical axis then the device can be used as a viewer while when the reflector is positioned across the optical axis it will direct an image for the purpose of projection on to a suitable screen or the like. This device is so constructed that the user can observe an image directly at the device when looking toward the table top on which the apparatus is mounted, while for the purpose of projecting an image the image is projected in a direction parallel to the surface of the table or the like on which the device is supported. Because of the limitations placed on the device to enable it to serve as a viewer, this construction is capable only of projecting a relatively small image.

It is a primary object of the present invention to provide a projector of the above general type capable of operating with stacks of slides of the type referred to above but having a light output of the order of that encountered in a conventional projector so that the projector of the invention can use a light source of relatively high power.

Furthermore, it is an object of the present invention to provide a projector in which the optical axis extends only along a single straight line.

First, it is an object of the invention to adapt a projector of the above type to use with a conventional optical structure, so that a special optical structure adapted for use with the upright stacks of slides is not required.

In addition, it is an object of the invention to provide a projector which can be operated in the manner of a conventional projector, so that the operator of the projector of the invention need not learn new techniques in order to be able to operate the projector properly.

Furthermore, it is an object of the invention to provide a slide projector which is exceedingly simple both in its construction and in its operation.

The objects of the present invention also include a projector which makes it possible for the operator not only to project an image from each slide but also to pass the slides through the projector without projecting images therefrom, so that only selected slides can be used, as the operator desires, to project images.

With the photographic slide projector of the present invention, a housing means carries an optical means which has a predetermined optical axis and which is capable of providing an image from a photographic slide when the latter is in an image-projecting position. The slide is supported in its image-projecting position by a slide-support means which in accordance with one feature of the invention is movably carried by the housing means for movement between an image-projecting position and a non-projecting position. Supply and receiving means are respectively arranged on opposite sides of the optical axis for respectively supporting a supply stack of slides which are to be projected and a receiving stack of slides to which the projected slides are directed to be received therein. These slides of the supply and receiving means are stacked in such way that each one can rest by gravity on the next lower slide. A slide-changing means of the invention is movably carried by the housing for movement from a predetermined starting position, where the slide-changing means receives a slide from the supply means, to a predetermined end position, and when the slide-changing means has reached its end position not only has a slide been shifted from the supply means to the slide-support means, but in addition the slide-shifting means and the slide-support means of the invention co-act to displace the slide support means from its non-projecting to its projecting position so that when the slide-changing means is in its end position the slide-support means will locate a slide carried thereby in its image-projecting position. According to a further feature of the invention the slide-changing means by remaining in its end position will maintain the slide-support means in its projecting position, and the slide-support means can return to its non-projecting position only when the slide-changing means is displaced from its end position back toward its starting position.

The invention is illustrated by way of example in the accompanying drawings which form part of the application and in which.

Figure 1:
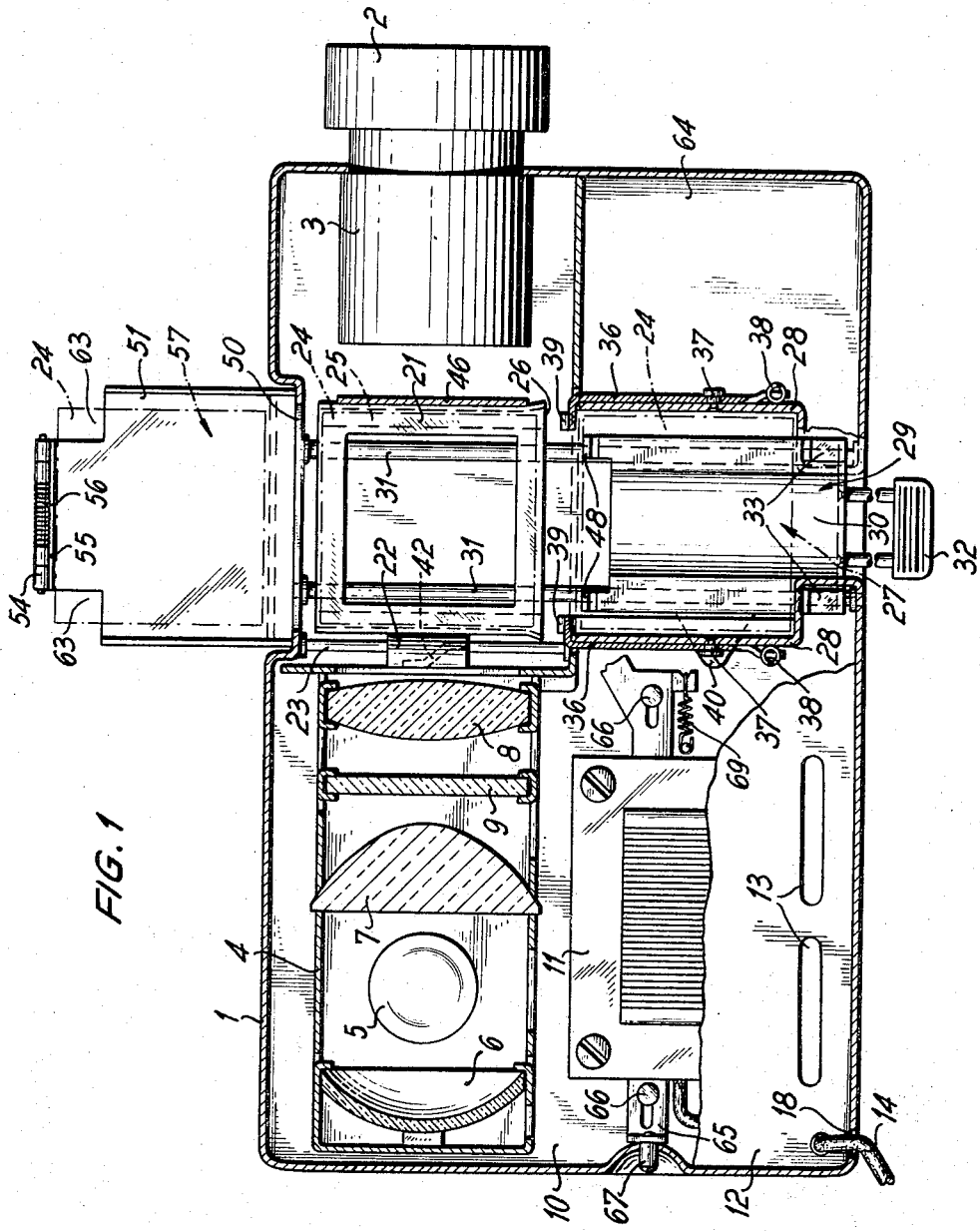
FIG. 1 is a sectional top plan view which in a partly diagrammatic and partly fragmentary manner illustrates the details of a slide projector according to the invention.
Figure 2:
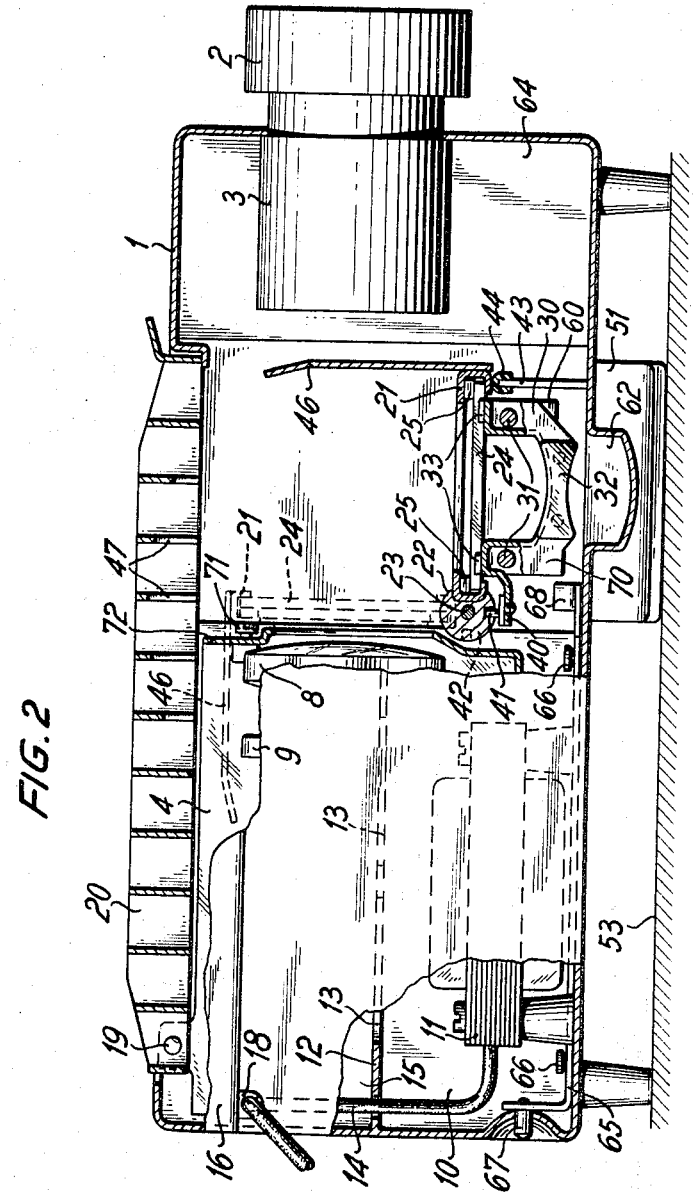
FIG. 2 is a partly schematic and partly broken away sectional side elevation of the slide projector of FIG. 1.
Figure 3:
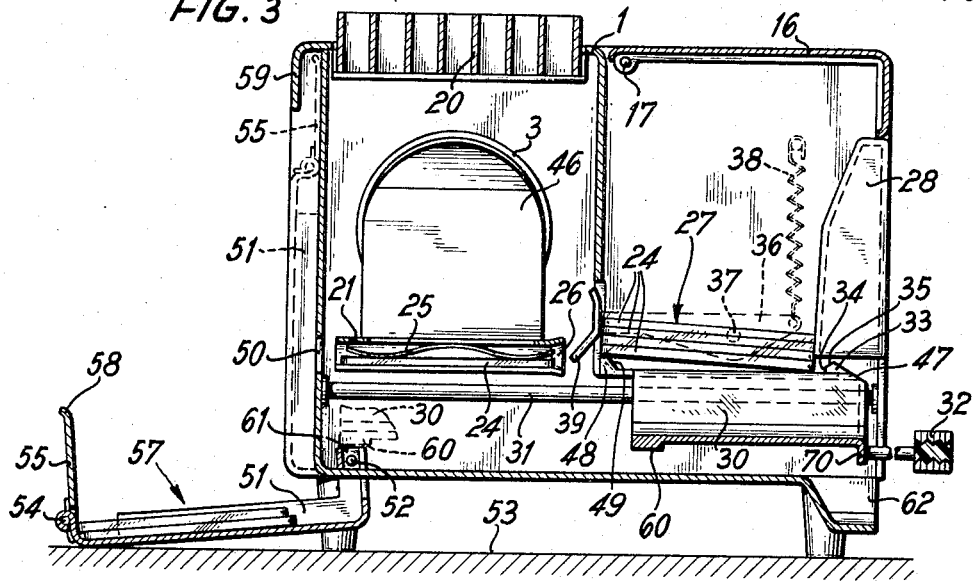
Figure 4:
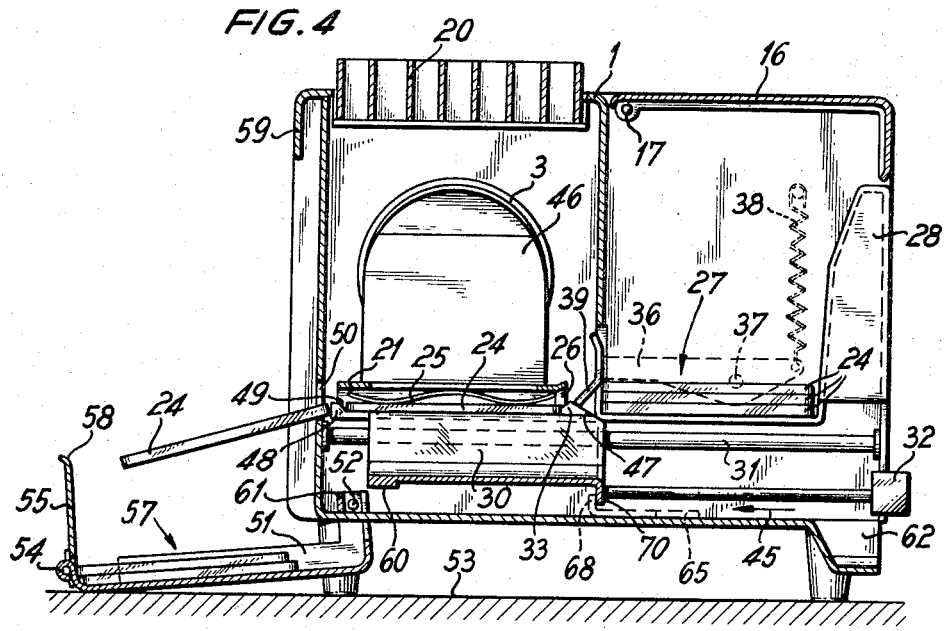

FIG. 3 is a transverse sectional elevation of the projector of FIGS. 1 and 2, the slide-changing means of the invention being shown in FIG. 3 in its starting position; and FIG. 4 is a transverse section of the projector showing the position which the parts of FIG. 3 take when the slide-changing means of the invention has displaced a new slide to the slide-support means of the invention but has not yet been displaced all the way to its end position.

Referring now to the drawings, there is shown therein a projector housing means 1 which is of a generally rectangular configuration, as is apparent from FIG. 1. At its front end, shown at the right in FIG. 1, the housing means 1 carries an objective 2 mounted in a suitable holder 3, which is fixedly carried by the housing means 1 and which renders the objective 2 adjustable, this objective 2 forming part of the optical structure of the projector of the invention. The optical axis of the objective 2 of course coincides with the optical axis of the entire optical assembly, and this optical axis extends in the projector of the invention along a straight line. The housing means 1 has interior, intermediate walls 4 which define an illuminating chamber in which the projection lamp 5, the reflector 6, the condenser lenses 7 and 8, and a filter 9 are situated, as shown most clearly in FIG. 1. The filter 9 is designed to protect against the heat of the lamp 5. Situated beside the chamber which accommodates this optical structure is an interior hollow chamber 10 of the housing means 1, and in this housing chamber 10 is accommodated a transformer 11 which provides the operating voltage for the lamp 5 when, for example, this lamp requires a low voltage or is in the form of an iodine lamp. Instead of a transformer, or in addition to a transformer, a motor-driven fan can be provided for cooling the elements of the projector which becomes heated.

As is particularly apparent from FIG. 2, and as may also be seen from FIG. 1, the chamber 10 is bounded at its upper end by an interior horizontal housing wall 12 which closes the top of the chamber 10. This wall 12 is formed with ventillating openings 13 as well as an opening through which the electrically conductive cable 14 passes, this cable forming the electrical cord which can be plugged into a suitable wall outfit so as to connect the projector to a source of power. When the projector is not used the cord 14 can be rolled up and stored in a housing chamber 15 which is defined on the one hand by the interior wall 12 and on the other hand by the outer walls of the housing. This chamber 15 is closed at its upper end by a top wall of the housing 1 which is formed in part at least at its top wall by means of a tiltable cover 16 which can be turned upwardly so as to give access to chamber 15. This top-wall forming cover 16 is supported for turning movement by a stationary elongated pin 17 which is carried by the housing and which extends through suitable openings of the cover 16, as shown particularly in FIGS. 3 and 4. As is indicated in FIGS. 1 and 2, that side wall portion of the housing 1 which is engaged by the cover 16 is formed with a notch 18 having an open top end and into which the cord or electrical cable 14 can be placed so as to pass conveniently through the side wall of the housing when the projector is used, and thus during use of the projector the cover 16 can be placed in its closed position while still permitting the cable 14 to pass through the notch 18.

As is particularly apparent from FIGS. 2–4, the housing means 1 includes over the illuminating chamber defined by the interior walls 4 a ventilating grid 20 supported for tilting movement by a horizontal pin 19 (FIG. 2). First, through this grid the interior of the illuminating chamber will have communication with the exterior while at the same time the entire grid can be turned about the pin 19 so as to assume an open position in which access may be had to the illuminating chamber.

As is indicated in FIG. 2, the grid 20 extends over the space within the housing means 1 which is situated between the condenser lens 8 and the objective holder 3, and it is in this latter space that the slide-support means and slide-changing means of the invention are situated.

As is indicated most clearly in FIGS. 1 and 2, the slide-support means of the invention is in the form of an open frame 21 which is adapted to engage a slide along edge portions of the latter. This frame 21 is fixed along one of its side edges, the left side edge thereof is viewed in FIGS. 1 and 2, to an elongated sleeve 22, which forms part of the slide-support means, and which is formed with an axial bore through which an elongated pivot pin 23 slidably extends. This pivot pin 23 is fixedly carried by the housing means 1 and also forms part of the slide-support means, so that the slide-support means is movable with respect to the housing means 1 for a purpose described below, and during its movement the slide-support means turns about the axis of the pivot pin 23. The open frame 21 has an upper wall, as viewed in FIG. 2, of rectangular configuration defining a rectangular window which is aligned with the part of the slide which provides the image which is to be projected, and the right and the left edges of this rectangular wall, whose configuration is apparent from FIG. 1, are connected with channel-shaped portions which extend along these edges of the frame 21 so as to embrace a pair of opposed edges of the slide and thus support the latter within the frame 21. It is of course one of the pair of opposed channel edges of the frame 21 which is fixed to the sleeve 22. Within these channels, to the lower surface of the rectangular frame portion are fixed a pair of wavy leaf springs 25, the configuration of which is most clearly apparent from FIGS. 3 and 4, and in FIGS. 3 and 4 the wavy, undulating leaf spring 25 shown therein is fixed at its right end to the frame 21. First, when a slide 24 is delivered into the opposed channels of the frame 21 the pair of leaf springs 25 will engage the upper surface of the slide 24 at its opposed edges and press the slide 24 downwardly against the bottom channel walls, as viewed in FIG. 2, so that in this way the position of the slide 24 is very precisely determined. As may be seen from FIGS. 3 and 4 as well as FIG. 1, the receiving end of the frame 21 which initially receives the leading end of the slide 24 has an outwardly flared portion 26 for facilitating entrance of a slide into the frame 21 of the slide-support means of the invention.

The slides which are delivered to the slide-support means are taken from a supply means which accommodates a stack 27 of slides 24 which are to be successively transported from the bottom end of the stack to the slide-support means. A plurality of walls 28 define the upright elongated hollow space within the confines of the housing means 1 in which the stack 27 is accommodated. As is apparent from FIGS. 3 and 4, within the stack 27 the slides 24 extend along a substantially vertical axis so that they can simply rest by gravity one upon the other while being guided by the walls 28 of the supply means. Thus, each slide 24 is situated substantially in a horizontal plane in the stack 27. The lowest slide 24 rests at its lower opposed surface portions which subsequently are in engagement with the frame 21 against a pair of inwardly directed bottom flange portions of the walls 28, and it is from these inwardly directed flanges that the lowermost slide 24 is shifted by the slide-changing means of the invention. The slides 24 are introduced into the space defined by the walls 28 from above. For this purpose the walls 28 define between themselves an elongated vertically extending space 29, indicated in FIG. 1, so that a finger for holding the stack 27 so as to introduce slides into the latter can easily pass through this opening 29. This passage or vertically extending opening 29 is defined by inwardly directed angle portions of the walls 28. The hollow space which accommodates the stack 27 can be closed from above by a tiltable cover which can take the form of an extension of the tiltable cover 16 or can be a seperate covering element separate from the remainder of the cover 16.

Directly beneath the stack 27 is situated the slide-changing means of the invention. This slide-changing means engages the lowermost slide 24 of the stack 27 and shifts it from the inwardly directed flanges of the pair of opposed vertically extending parallel walls 28 which define the right and left boundaries of the vertical stack-receiving space, as viewed in FIG. 1. The slide-changing means shifts a slide from the bottom of the stack 27 into the frame 21 of the slide-support means of the invention. This slide-changing means includes a slide-changing member 30 which is shiftable along a pair of stationary guide rods 31 fixedly carried by the housing means 1, extending perpendicularly to the optical axis, and being parallel to the pivot pin 23. These guide rods 31 extend slidably through openings formed in the slide-shifting member 30. A handle 32 is fixed to the slide-shifting member 30 so that in the illustrated example the member 30 can be manually shifted along the guide rods 31.

At its upper surface which is directed toward the lowermost slide 24 of the stack 27, the slide-shifting member 30 has provided therewith a pair of motion-transmitting portions 33 of identical configuration projecting from the upper surface of the member 30. These motion-transmitting members 33 have, as is shown particularly in FIG. 3, abutment edges 34 at their left ends, as viewed in FIG. 3, extending perpendicularly from the upper surface of the member 30 and adapted to engage the right edge of the lowermost slide 24 of the stack 27, as viewed in FIG. 3. This engagement takes place when the member 30 is shifted from its starting position shown in FIG. 3, to the left as viewed in FIG. 3, toward an end position situated to the left beyond the position of the member 30 shown in FIG. 4. As a result, this shifting of the member 30 will displace the lowermost slide from the bottom flanges of the walls 28 toward and into the frame 21 through the substantially conically flared entrance opening 26 thereof, and FIG. 4 shows the position in which the parts take when a slide 24 has been displaced all the way into the frame 21. The abutment edges 34 have a width which is somewhat less than the thickness of the slides, so that these abutment edges 34 will reliably pass beneath the second slide of the stack. In this way the shifting movement of member 30 will be transmitted only to the lowermost slide. The slide which rests on the lowermost slide is engaged by the inclined surfaces 35 of the projections 33 which extend to the right from and upwardly from the abutment edges 34 thereof, as viewed in FIG. 3. These inclined surface portions 35 displace the second slide and all of the slides thereon upwardly until the crest of the projections 33 reaches the lower surface of the second slide, and in this way the second slide is separated from the lowermost slide of the stack. The crests of the projections 33 will now slide along the lower surface of the second slide while displacing the lowermost slide away from the stack 27 into the slide-support means. Because of this positive separation of the second slide from the lowermost slide, shifting of the second slide by frictional contact with the lowermost slide is reliably avoided.

In order to guarantee further that the second slide will not shift with the lowermost slide, the front and rear walls 28 carry a pair of pivots 37 on which a pair of levers 36 are turnably mounted, at the exterior of the walls 28. These levers 36 are respectively connected with the lower ends of springs 38 whose upper ends are fixed to stationary pins situated at the exterior of the front and rear walls 28, so that, as viewed in FIGS. 3 and 4, the springs 38 urge the levers 36 to turn in a counterclockwise direction about the pins 37. The ends of the levers 36 which are distant from the springs 38 are respectively provided with lugs 39 situated in the path of movement of the lowermost slide 24 into the outwardly flaring end 26 of the frame 21, so that this lowermost slide engages the lugs 39 to displace them out of its path and thus these lugs 39 frictionally engage the upper surface of the lowermost slide 24 which displaces the levers 36 in opposition to the springs 38. While it is quite easy for the lowermost slide which is engaged by the abutment surfaces 34 of the shifting member 30 to engage the lugs 39 and turn the levers 36 in opposition to the springs 38, the second slide which only frictionally engages the lowermost slide cannot engage the lugs 39 with the same force as the lowermost slide and is incapable of turning the lugs 39 together with the levers 36 in opposition to the springs 38 which have a force sufficiently great to guarantee that the frictional contact between the two lowermost slides will be insufficient to produce turning of the levers 36 by the second slide, and thus in this way also the structure will reliably operate only to displace the lowermost slide from the stack 27 into the frame 21.

In accordance with a further feature of the present invention, the slide-changing means 30 and the slide-support means 21, 22 coact in such a way that the slide-support means is displaced from its non-projecting position as shown in solid lines in FIG. 2 into its projecting position as shown in dotted lines in FIG. 2 as a result of the movement of the slide-changing means. This coaction is brought about by a structure which includes a camming pin and a camming surface engaged thereby. This camming pin takes the form of a pin 41 eccentrically mounted on a disc which is turnable on a lug 40 of the shifting member 30, as shown most clearly in FIG. 2. The disc which carries the camming pin 41 can be fixedly maintained at any desired angular position so that in this way the position of the pin 41 can be adjusted. The sleeve 22 of the slide-support means is formed at its exterior surface with a camming surface portion which cooperates with the pin 41 to be engaged thereby for turning the slide-support means between its projecting and non-projecting positions. This camming surface at the exterior of the sleeve 22 takes the form of an elongated groove 42 having a pair of camming portions extending parallel to the pin 23 and angularly displaced about the latter by 90 degrees, these pair of elongated camming portions of the groove 42 being interconnected by a helical intermediate groove portion, as indicated most clearly in FIG. 1 where the groove 42 appears in dotted lines. This, the elongated axially extending groove portions are situated at the beginning and end of the camming surface. The end of the groove 42 which is situated at the end face of the sleeve 22 which is nearest to the shifting member 30 is open and is in alignment with the pin 41 so that the latter will move directly into the lowermost part of the groove 42 when the frame 21 is in its lowermost position shown in solid lines in FIG. 2, this latter position of the frame 21 being the non-projecting position thereof.

Because of the way the frame 21 together with the sleeve 22 are mounted on the pin 23, this frame 21 tends by its own weight to assume the solid line position shown in FIG. 2. In this latter non-projecting position of the slide-support means the edge of the frame 21 which is distant from the elongated pivot pin 23 engages a supporting wall 43 which forms a stop for determining the non-projecting position of the frame 21. An elongated padding layer 44 is situated along the upper edge of the stop-plate 43 to engage the frame 21 so as to determine the position thereof shown in solid lines in FIG. 2. When the frame 21 is in this non-projecting position, its relationship with respect to the slide-changing means 30 is such that the lowermost slide 24 will move without any interference into the frame 21, and at the same time the camming pin 41 will be received without any interference into the camming groove 42. The configuration of this groove and the location of the pin 41 are such that the pin 41 reaches the end of the first straight-line groove portion when the lowermost slide which has just been displaced from the stack 27 has been fully introduced into the frame 21. In other words, the slide-changing means when moving from the starting position of FIG. 3 to its opposed end position will initially move through a first increment of movement during which the slide has been displaced from the bottom end of the stack 27 fully into the frame 21, and this is the position of the parts which is shown in FIG. 4. It is only after movement of the lowermost slide fully into the frame 21 has been completed that the shifting member 30 moves through its second increment of movement during which the camming pin 41 moves along the helical intermediate portion of the camming groove 42 from the first straight-line portion thereof to the second axially extending straight-line portion thereof so as to turn the frame 21 from the solid to the dotted line position thereof shown in FIG. 2. Thus, when the parts have reached the position shown in FIG. 4, the operator will continue to move the slide-changing means in the direction of the arrow 45 beyond the position thereof shown in FIG. 4 so as to provide between the camming surface of the groove 42 and the pin 41 the coaction which will displace the slide-support means from its non-projecting into its projecting position. The frame 21 will therefore turn together with the sleeve 22 about the pin 23 through an angle of 90 degrees up to the dotted line position shown in FIG. 2. When the frame 21 has thus been displaced to its projecting position the slide 24 carried thereby is also in its image-projecting position, and the continued movement of the shifting member 30 all the way to its end position will displace the camming pin 41 into the second straight-line portion of the camming groove 42 so that when cooperating with the latter portion of the camming groove the pin 41 will serve to lock the sleeve 22 and the frame 21 in the projecting position shown in dotted lines in FIG. 2. Therefore, at this time, the operator can release the handle 32 and the parts will remain in the position where the slide-support means is in its projecting position and the slide-changing means is at its end position distant from its starting position shown in FIG. 3.

An adjusting means is provided for precisely determining the location of the slide-support means when the latter is in its projecting position, and in the illustrated example this adjusting means includes a screw 71 threadedly carried by an intermediate wall portion 72 of the housing means so that the position of the screw 71 can be adjusted, and it is the head of this screw which is engaged by the frame 21 when the latter is in its projecting position. As soon as the frame 21 begins to turn toward its projecting position, the slide 24 situated therein is displaced beyond the path of movement of the motion-transmitting projections 33 of the shifting member 30, so that these elements 30 will not continue to displace a slide while the camming structure acts to turn the slide-support means from its non-projecting into its projecting position.

Upon return of the slide-changing means 30 from its end position back to its starting position, the camming pin 41 coacts with the camming groove 42 of the sleeve 22 to turn the latter together with the frame 21 back to their non-projecting positions shown in solid lines in FIG. 2. This displacement of the frame 21 back to the solid line position shown in FIG. 2 will displace an opaque plate 46 to the position shown in solid lines in FIG. 2 where this plate 46 extends across the optical axis. This plate 46 is fixed to the edge of the frame 21 distant from the sleeve 22 for turning movement with the frame 21, and when the frame 21 is in its non-projecting position shown in solid lines in FIG. 2, the opaque plate 46 acts as a shield to prevent light from being projected through the objective 2. The path of turning of the upper edge of the shielding plate 46, as viewed in FIG. 2, requires several of the elements of the grid 20 to be formed with the cutouts 47 indicated in FIG. 2 so as to provide clearance for the turning movement of the light-interrupting plate 46 to the dotted line position shown in FIG. 2 where it does not interfere with the projection of light along the optical axis through the objective. Instead of an opaque plate 46, any other covering device for preventing projection of the light rays when the frame 21 is in its non-projecting position may be used, and devices of this general type may be controlled in a known way from the slide-changing means.

The return of the slide-changing means 30 back to its starting position will produce no movement of the slide 24 situated in the frame 21. The shifting member 30 is provided at its left end, as viewed in FIGS. 3 and 4, with slide-ejecting projections 48 respectively provided with inclined surfaces 49 which do indeed engage the slide which was just in the projecting position, and by the sliding engagement between this slide and the edges 49 the frame 21 is turned slightly from its lowermost non-projecting position until the ejecting projections 48 move beyond the slide with the shifting member 30 back to the starting position shown in FIG. 3. Simultaneously, the motion-transmitting projections 33 engage with their inclined surfaces 47 along the opposed edges of the slide 24 which is now at the bottom of the stack 27 so that the stack is raised slightly and the crest of the projections 33 moves back along the bottom-most slide until the structure again reaches the position shown in FIG. 3. During the last part of the return movement of the slide-changing means back to its starting position the inclined surfaces 35 of the projections 33 move along the right edge of the lowermost slide 24, as viewed in FIG. 3, and it will be noted that the ejecting projections 48 engage the stack and tilt the latter so that the left edges of the slides 24, as viewed in FIG. 3, have an elevation somewhat higher than the right edges thereof. In this way the structure very reliably guarantees that the free right edge of the lowermost slide 24 will be properly positioned to be engaged by the abutment shoulders 34 during the initial displacement of the shifting member 30 from its starting position shown in FIG. 3.

It is during this subsequent movement of the slide-changing means from its starting position again toward its end position that the lowermost slide is again shifted into the frame 21 in the manner described above, and simultaneously with this movement the ejecting projections 48 will engage the slide which was just previously situated in the frame 21 and will push this latter slide out through a slot 50 formed in a side wall of the housing 1. This displacing of the previously projected slide out of the projector is particularly apparent from FIG. 4.

The ejected slide 24 which passes through the slot 50 falls due to its own weight into the receiving means where the stack of projected slides is situated. This receiving means is formed by a tiltable member 51 pivotally connected with the housing means 1. For this purpose the housing means carries a stationary pivot 52 which pivotally mounts the receiving means 51 in such a way that the latter is capable of resting directly on the surface 53 which supports the entire projector. In this way, the greatest possible height for the stack of projected slides can be achieved, inasmuch as this height is determined by the distance between the slot 50 and the surface 53 on which the entire projector rests. This tiltable member 51 carries a pivot pin or hinge 54 about which a wall 55 is turnable, and a spring 56 (FIG. 1) cooperates with the wall 55 which is provided with suitable stop projections so as to maintain the wall 55 yieldably in the position as shown in FIGS. 3 and 4 where it forms a side wall of the receiving means. However, the spring 56 can yield to permit the wall 55 to turn in a counterclockwise direction from the position thereof shown in FIGS. 3 and 4, for a purpose described below. Thus, in the open position of the receiving means shown in FIGS. 3 and 4, the tiltable member 51 thereof will rest directly on the surface 53 while the turnable wall 55 will form a side of the receiving means. This receiving means serves to receive the stack 57 of projected slides.

During non-use of the projector the member 51 can be turned to its rest position indicated in dotted lines in FIG. 3. At this time the rounded free edge of the wall 55 will engage and slide along the exterior side surface of the left side wall of the housing 1, as viewed in FIGS. 3 and 4. Thus, the rounded free edge 58 will slide along this exterior surface of the housing 1 as the member 51 is turned to its rest position shown in dotted lines in FIG. 3. This movement continues until the member 51 directly engages and lies flush against the exterior surface of the housing, at which time the wall 55 assumes the position shown in dotted lines at the upper left portion of FIG. 3 where the wall 55 also lies flush against the exterior surface of the housing 1. The housing includes a covering portion 59 which extends partly over the wall member 55 in the manner indicated in FIG. 3. As is shown most clearly in FIG. 1, the sidewall of the housing means 1 which accommodates the receiving means is formed with a recess into which this receiving means moves when it is displaced to its rest position shown in dotted lines in FIG. 3, and in its rest position the exterior surface of the member 51 is in alignment with the exterior side surface of the sidewall of the housing 1 shown at the left in FIG. 3 and situated in the immediate vicinity of the recess which receives the member 51. Also it will be noted that the cover 59 has an exterior side surface which is also flush with and forms an extension of the remainder of the side surface of the housing 1, so that no structure projects beyond the side surface of the housing 1 when the parts are displaced to their rest position of non-use.

When the receiving means has been displaced to its rest position as shown in dotted lines in FIG. 3, an edge portion 61 which is adjacent the pivot 52 will extend horizontally, and at this time a downwardly directed end surface portion 60 of the slide member 30, shown at the lower left thereof in FIG. 3, can be placed over the edge 61 when the shifting member 30 is displaced into its end position. The lower left corner of the member 30 is shown in this end position in FIG. 3 in dotted lines where the engagement between the surfaces 60 and 61 is also indicated in dotted lines, so that by turning the member 51 to its rest position and then displacing the member 30 from its starting to its end position it is possible for the surfaces 60 and 61 to engage each other for releasably locking the receiving means in opposition to the spring 56 in the rest position shown in dotted lines in FIG. 3. Thus, the spring 56 acts on the wall member 55 to tend to displace the receiving means back to its operating position, and this will result in pressing of the edge or surface 61 against the surface 60, so that in this way the parts are resiliently and releasably locked in their inoperative positions. When the shifting member has been displaced from its starting position shown in FIG. 3 into its end position, the handle 32 becomes situated at a position where it does not project beyond the exterior surface of the housing means 1, so that when all of the parts are in their rest positions the entire projector does not include any elements which project beyond the exterior surface of the sidewall of the housing means 1.

In order to facilitate engagement of the handle 32 when the shifting member 30 is in its end position indicated in dotted lines in FIG. 3, the bottom wall of the housing means is provided at the location of the handle 32 with a depressed portion 62 (FIGS. 2–4) providing free access to the handle 32. Above the handle 32 is situated the free opening 29 through which access may be had to the supply stack, as pointed out above. When the shifting member 30 is displaced with a relatively light force from its locked position indicated in dotted lines in FIG. 3, the surface 60 thereof will move away from the surface 61 of element 51 so that the spring 56 will now displace the receiving means back to its operative position shown in FIGS. 3 and 4, and thus the receiving means will automatically assume its operative position.

In order to facilitate removal of the stack 57 from the member 51, this member 51 is provided with notches 63 at its corners distant from the housing, as indicated in FIG. 1, so that it is possible for the operator to easily engage the lowermost slide of the stack 57 for displacing the latter out of the member 51.

Instead of a manually operable slide-changing means, it is also possible to provide a mechanically driven slide-changing means. The force required to operate such a mechanically driven slide-changing means can be taken from the same motor which drives the cooling fan.

In the event that a special driving motor is used for this purpose together with the known additional structure required to provide a mechanically driven slide-changing means, this structure can be accommodated in the housing chamber 64 which is situated beside the objective holder 3, as indicated in FIGS. 1 and 2. Therefore, it is apparent that before and after the supply means which accommodates the stack 27 the housing means includes chambers capable of accommodating structure for the projector, and these latter chambers are situated with respect to the supply means in the direction in which the optical axis extends. In the chamber 64 as well as in the immediate vicinity of the holder 3, it is possible to accommodate known remotely controlled structure for adjusting the objective.

The above often described slide-changing means also renders it possible to displace a slide from the supply stack 27 into the receiving stack 57 without projecting the slides. In other words the operator has the option either of directly displacing the slides through the projector from the stack 27 to the stack 57 without projecting the slide, or the operator can project an image of the photograph carried by the slide, if the operator so chooses. For this purpose the slide-shifting member 30 is not displaced through its second increment of movement all the way to its end position. Instead it is only moved through its first increment of movement from the starting position of FIG. 3 into the position shown in FIG. 4, and this movement, it will be recalled from the above description, is sufficient only to displace a new slide into the frame 21 but is insufficient to displace the frame 21 from its non-projecting into its projecting position. The camming pin 41 is at the end of the initial straight-line groove portion of the camming grove 42 but has not yet reached the helical intermediate portion thereof in order to provide the turning of the frame 21. The operator will readily feel when the camming pin is at the junction between the initial straight-line portion and the intermediate helical portion of the camming groove where the shipping member 30 is situated at the end of its first increment of movement indicated in FIG. 4, because the displacement of the camming pin 41 along the helical intermediate portion of the camming groove 42 requires a force different from that required to shift the pin 41 along the initial straight-line portion of the groove 42. At this time the force required to shift the lowermost slide 24 from the stack 27 is no longer necessary and instead the force required to turn the frame 21 from its non-projecting to its projecting position is required. Upon return of the shifting member 30 back to its starting position after having only been displaced through the first increment of movement up to the position shown in FIG. 4, the slide which has been displaced into the frame 21 will remain therein although the frame 21 has not been displaced to its projecting position, and thus when the next slide is displaced into the frame 21 the slide 24 already therein will be automatically ejected through the slot 50 in the manner described above, so that in this way it is possible for the operator to choose not to project a selected slide.

Instead of relying on the "feel" of the handle 32, however, the fact that the shifting member 30 has reached the end of its first increment of movement can be indicated very positively to the operator by the use of a releasable, manually operable stop means of the invention. For this purpose the structure includes, as shown most clearly in FIGS. 1 and 2, a stop member 65 capable of sliding into the direction of the optical axis, and for this purpose pin-and-slot guides 66 are provided to guide the stop member 65 in its sliding movement parallel to the optical axis. The rear end of the elongated stop member 65 carries an adjusting button 67 which is freely accessible to the hand of the operator, while the other hand of the elongated stop member 65 carries an angularly extending part terminating in an upwardly directed stop projection 68 shown most clearly in FIGS. 2 and 4. It is possible for the operator, if he so chooses, to situate this stop projection 68 in the path of movement of part of the shifting member 30. A spring 69 (FIG. 1) acts on the stop member 65 to urge the latter into the end position shown in FIG. 1 where the projection 68 is situated beyond the path of movement of the shifting member 30. At this time the tip of the button 67 is in alignment with the exterior rear surface of the side wall of the housing means 1. When the operator presses the button 67 in opposition to the spring 69 so as to displace the stop member 65 toward the front of the projector, to the limit provided by the length of the slot of the pin-and-slot guide 66, the stop projection 68 will, as shown in dotted lines in FIG. 4, be situated in the path of movement of a downwardly directed projection 70 of the shifting member 30, so as to engage this projection 70 when the shifting member 30 has reached its position shown in FIG. 4 upon completion of the first increment of movement so as to displace a slide 24 completely into the frame 21. First, the projection 68 will engage the projection 70 before the shifting member 30 has been moved into its second increment of movement to initiate turning of the frame 21 upwardly toward its projecting position, and thus the operator will know by engagement of the projection 70 with the projection 68 that the slide which is not to be projected has reached and been fully introduced into the frame 21. First, when the shifting member 30 has been displaced by the operator as far as it can be displaced with the button 67 depressed inwardly, the operator will return the handle 32 into its starting position so that the next slide can be brought into position within the frame 21 without projecting the previously shifted slide 24.

Of course, the above-described possibility of not projecting a chosen slide of the stack 27 can be provided also with a mechanically driven slide changer. In this case the driving motor and the slide-changing means are not interconnected by positive motion-transmission elements. Instead, the transmission between the driving motor and the slide-changing means includes a known clutch structure capable of responding to an overload, such as for example, a friction clutch which during normal slide changing transmits the motion but which, upon blocking of the slide-changing means before it reaches its end position, as by engagement of the stop projection 68 with projection 70, slips so as to terminate transmission of the motion and thus terminate the movement of the shifting member 30 when it reaches the first increment of movement indicated in FIG. 4.

Therefore, by providing the mechanically driven slide changing means with a suitable slip clutch the operator can use the very same manually operable stop member 65 for the purpose of optionally preventing projection of a selected slide.

The feet which support the housing of the projector of the invention can in a known way have their length adjustable, and in fact the adjustability provided for the length of the feet is made such that this length can be changed by a considerable amount beyond the normal length of the feet which support the projector housing. This possibility of adjusting the length of the feet of the housing can be used not only to properly orient the housing 1 so as to aim the optical axis in the desired direction and position it in a desired manner with respect to the surface 53, but in addition this adjustability of feet of the housing is used to determine the distance between the housing and the surface 53 so that it makes possible the use of a particularly deep member 51 capable of receiving a relatively large number of slides in the stack 57. In this way it is possible to use the projector, without any particular interruption, at least to enable the use of the projector very conveniently with a supply stack 27 which is introduced at the beginning of a particular presentation.

In the slide projector described above and shown in the drawings, the longitudinal axis of the stacks 27 and 57 extend substantially vertically in a direction perpendicular to the surface 53, and the angle of turning of the frame 21 is approximately 90 degrees with this frame 21 being turnable between horizontal and vertical positions. It is however easily possible to provide an arrangement where the longitudinal axis of the stacks of slides will vary somewhat and be inclined to an axis perpendicular to the surface 53, and in this case the frame 21 will be turned through a different angle, for example an angle smaller than 90 degrees.

What is claimed is:
1. In a photographic slide projector, housing means, optical means carried by the said housing means for projecting an image from a photographic slide situated in an image-projecting position extending across the optical axis of said optical means, supply means and receiving means respectively situated on opposite sides of said optical axis for respectively holding a stack of slides to be supplied to said image-projecting position and a stack of slides to be received from said image-projecting position, said supply means and said receiving means each accommodating a stack of slides at an attitude where one slide can rest by gravity on the next lower slide, slide-support means carried by said housing means for supporting a slide, said slide-support means being carried by said housing means for movement between a projecting position where a slide carried by said slide-support means is in said image-projecting position and a non-projecting position where said slide-support means and a slide carried thereby are situated beyond the optical axis, and slide- changing means movably carried by said housing means for movement from a given starting position to a given end position and then back to said starting position, said slide-changing means when in said starting position thereof receiving a slide from said supply means and during movement from said starting position towards said end position shifting a slide from said supply means to said slide-support means while simultaneously displacing from the latter to said receiving means the slide which has just occupied the image-projecting position, said slide-changing means and slide-support means co-acting to displace said slide-support means with the slide carried thereby from said non-projecting to said projecting position by the time said slide-changing means has reached said end position thereof, said slide-changing maintaining said slide-support means in said projecting position while said slide-changing means remains in said end position thereof and said slide-support means returning to said non-projecting position thereof only when said slide-changing means is displaced from said end position back toward said starting position thereof.

2. In a projector as recited in claim 1, said slide-changing means during movement from said starting position to said end position advancing through a first increment of movement during which a new slide is delivered to said slide-support means while the previously projected slide is displaced therefrom, and said slide-changing means then moving through a second increment of movement to said end position and during such second increment of movement coacting with said slide-support means to displace the latter from said non-projecting to said projecting position thereof, so that movement of said slide-support means from said non-projecting to said projecting position thereof does not commence until after a slide has been delivered to said slide-support means by said slide-changing means.

3. In a slide projector as recited in claim 1, said slide-support means when moving between said projecting and non-projecting positions thereof turning about an axis which extends parallel to the direction of movement of said slide-changing means.

4. In a projector as recited in claim 3, said slide-support means including an elongated pivot pin carried by said housing means and extending along the axis about which slide-support means turns, said slide-support means including an open frame for receiving a slide from said slide-changing means and supporting the slide at the region of edge portions thereof, and stop means carried by said housing means and cooperating with said slide-support means for determining said non-projecting position and said projecting position thereof, said frame of said slide-support means, when the latter is in said non-projecting position being situated in the path of movement of the slide from said supply means by said slide-shifting means for receiving a slide transported thereby.

5. In a projector as recited in claim 4, said stop means being adjustable.

6. In a projector as recited in claim 5, said adjustable stop means including at least one screw member threadedly carried by a part of said housing means and having a head end situated in the path of movement of said frame to engage and determine one of the positions of the latter.

7. In a projector as recited in claim 1, said slide-support means and said slide-changing means respectively including motion-transmission members one of which has a camming surface and the other of which has a camming pin engaging said surface for displacing said slide-support means between said positions thereof during movement of said slide-changing means.

8. In a projector as recited in claim 7, said slide-changing means carrying said camming pin and said slide-support means having a camming portion provided with said camming surface which is engaged by said pin to displace said slide-support means during movement of said slide-shifting means.

9. In a projector as recited in claim 8, said slide-changing means adjustably carrying said pin so that the position of the latter can be adjusted.

10. In a projector as recited in claim 8, said slide-support means including an elongated pivot pin carried by said housing means and extending in the direction of movement of said slide-changing means, and an elongated sleeve formed with an axial bore through which said pivot pin slidably extends, said sleeve being fixed through the remainder of said slide-support means so that the latter turns about said pivot pin while being displaced between said projecting and non-projecting positions, said camming surface forming part of a camming groove in said sleeve and said groove having a pair of elongated portions angularly displaced about said pivot pin and extending substantially parallel to and intermediate portion extending helically about said pivot pin and interconnecting said elongated groove portions, one of said elongated groove portions terminating at an end of said sleeve in an open end situated in the path of movement of said camming pin during displacement of said slide-changing means from said starting toward said end position thereof, so that said camming pin is received in said groove to move first along said one elongated portion thereof while displacing a slide to said slide-support means which is in said non-projecting position thereof, and said camming pin then moving along said helically-extending intermediate groove portion to displace said slide-support means from said non-projecting position to said projecting thereof, whereupon said camming pin reaches the other of said elongated groove portions to maintain said slide-support means in said projecting position thereof.

11. In a projector as recited in claim 8, said slide-support means including an elongated pivot pin extending in the direction of movement of said slide-changing means and an elongated sleeve formed with an axial bore through which said pivot pin slidably extends, said sleeve being fixed with the remainder of said slide-support means so that the latter transmits said sleeve about said pivot pin during movement between said projecting and non-projecting positions thereof, said sleeve having an exterior surface portion formed with said camming surface to be engaged by said camming pin during displacement of said slide-changing means for moving said slide-support means between said projecting and non-projecting positions thereof, and said camming surface including a pair of surface portions extending substantially parallel to said pivot pin and angularly displaced about said pivot pin and an intermediate connecting surface portion interconnecting said pair of camming surface portions.

12. In a projector as recited in claim 1, said slide-support means having an outwardly flaring end for receiving a slide delivered to said slide-support means by said slide-changing means.

13. In a projector as recited in claim 1, said supply means being situated within the confines of said housing means and including substantially upright walls which defines an elongated substantially upright hollow space for receiving a supply of slides to be projected with said supply of slides arranged in a stack wherein one slide rests upon the next lower slide.

14. In a projector as recited in claim 13, said housing means having an exterior substantially rectangular configuration.

15. In a projector as recited in claim 1, said housing means having a substantially rectangular configuration and said receiving means projecting at least in part from a side wall of said housing means to receive slides displaced from said slide-support means.

16. In a projector as recited in claim 15, said receiving means being pivotally connected to said side wall of said housing means for movement to and from the latter.

17. In a projector as recited in claim 16, said receiving means having a rest position engaging said side wall of said housing means and when in said rest position having an edge portion siutated at a predetermined location, said slide-changing means when displaced to said end position thereof engaging said edge portion of said receiving means when the latter is in said rest position thereof for releasably holding said receiving means in said rest position as long as said slide-changing means remains in said end position thereof during non-use of the projector.

18. In a projector as recited in claim 17, said slide-receiving means including a wall portion and a spring connected thereto for usably maintaining said wall portion in a position forming a wall of said receiving means when the latter is in an operative position for receiving slides, said wall portion of said receiving means engaging said side wall of said housing means and being displaced in opposition to said spring in a position extending along said side wall of said housing means when said receiving means is in said rest position thereof.

19. In a projector as recited in claim 17, said side wall of said housing means being formed with a recess which receives said receiving means when the latter is in said rest position thereof, and said receiving means when in said rest position in said recess having an exterior surface which is in alignment with and forms a continuation of the exterior surface of said side wall of said housing means which is situated in the immediate region of said recess thereof.

20. In a projector as recited in claim 19, said housing means including a covering portion covering a top end of said recess, extending over part of said receiving means when the latter is in said rest position thereof and also being in alignment with the exterior surface of said side wall of said housing means at the portions thereof situated in the immediate vicinity of said recess.

21. In a projector as recited in claim 1, said housing means including a side wall formed with a slot through which slides are displaced during introduction of a new slide into said slide-support means, said receiving means receiving slides which pass through said slot.

22. In a projector as recited in claim 1, said housing means including at least one chamber for receiving components of the projector, and said chamber being situated with respect to said supply means in a direction which is at least substantially parallel to the optical axis.

23. In a projector as recited in claim 22, cover means for covering chamber period.

24. In a projector as recited in claim 1, said housing means having a top wall, and cover means releasably covering said supply means to close the latter off from said top wall.

25. In a projector as recited in claim 1, said housing means having a bottom wall and said slide-support means when in said non-projecting position thereof being substantially parallel to said bottom wall, said supply means and said receiving means respectively supporting stacks of slides in positions where said stacks respectively have axes which are substantially perpendicular to said bottom wall of said housing means.

26. In a projector as recited in claim 1, said slide-changing means during movement from said starting to said end position advancing through a first increment of movement to displace a slide from said supply means to said slide-support means while displacing the previously projected slide away from said slide-support means, and said slide-changing means then moving through a second increment of movement to said end position and coacting with said slide-support means to displace the latter from said non-projecting position to said projecting position only during movement of said slide-changing means through said second increment of movement, so that a slide has been completely delivered to said slide-support means when said slide-changing means has completed said first increment of movement, and releasable stop means carried by said housing means and movable at the option of the operator to a position situated in the path of movement of said slide-changing means for preventing the displacement of the latter beyond said first increment of movement thereof.

27. In a projector as recited in claim 26, said releasable stop means being manually displaceable to said position in the path of movement of said slide-changing means, and including a spring connected to said stop means for releasably maintaining the latter in a position situated out of the path of movement of said slide-changing means so that the latter can move through said second increment of movement thereof except when the operator manually displaces said stop means to its position in opposition to said spring situated in the path of movement of said slide-changing means.

References Cited

UNITED STATES PATENTS

| | | | |
|---|---|---|---|
| 2,795,169 | 6/1957 | Wottring | 88—28 |
| 2,849,814 | 9/1958 | Rideout | 88—28 |
| 2,933,979 | 4/1960 | Lacoe | 88—28 |
| 3,126,785 | 3/1964 | Zillmer | 88—26 |
| 3,174,395 | 3/1965 | Krull | 88—28 |

NORTON ANSHER, *Primary Examiner.*

R. M. SHEER, *Assistant Examiner.*